Nov. 28, 1967  R. A. GIBBONS  3,355,027
PORTABLE COMBINATION CARRIER AND RACK FOR BASKETBALLS AND THE LIKE
Filed Sept. 13, 1965  2 Sheets-Sheet 1
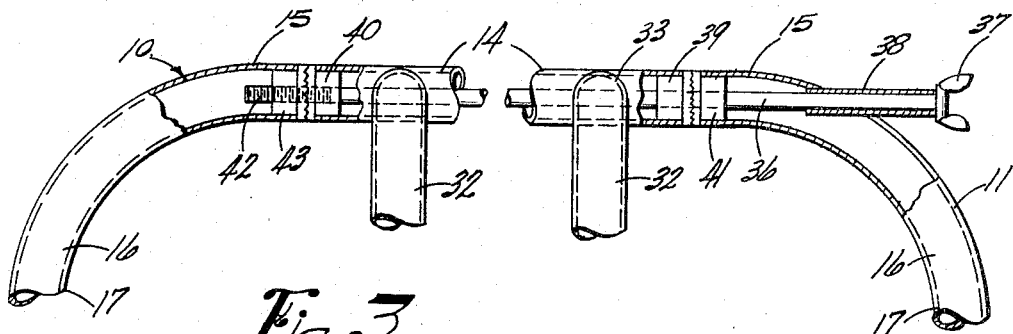
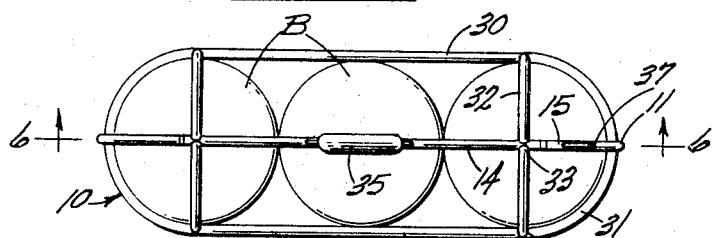
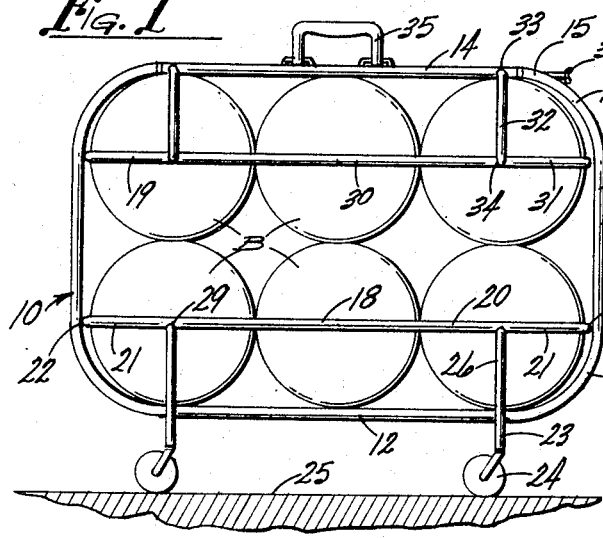
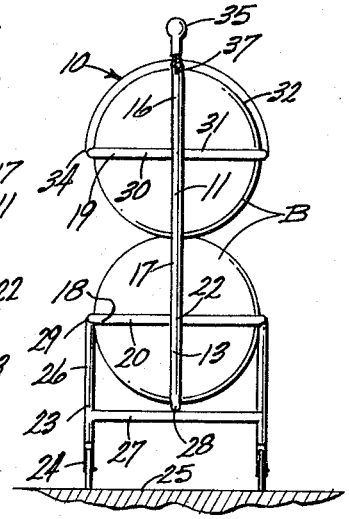
INVENTOR.
ROGER A. GIBBONS.
ATTORNEY.

Nov. 28, 1967  R. A. GIBBONS  3,355,027
PORTABLE COMBINATION CARRIER AND RACK FOR
BASKETBALLS AND THE LIKE

Filed Sept. 13, 1965  2 Sheets-Sheet 2

INVENTOR
ROGER A. GIBBONS

ATTORNEY 3,355,027
PORTABLE COMBINATION CARRIER AND RACK FOR BASKETBALLS AND THE LIKE
Roger A. Gibbons, Clintonville, Wis., assignor to Romac, Inc., Fond du Lac, Wis., a corporation of Wisconsin
Filed Sept. 13, 1965, Ser. No. 486,768
10 Claims. (Cl. 211—14)

This invention relates to a portable combination carrier and rack for basketballs and the like, such as volley balls, kickballs, etc.

Basketballs were heretofore carried in large cumbersome canvas bags that were extremely awkward to handle and transport from place to place on buses and trains. The principal object of my invention is to provide a portable combination carrier frame and rack, which, in addition to being handier to carry and transport from place to place with as many as six basketballs in each unit, serves as a handy rack on which to keep the balls upon arrival at the destination between and during practice sessions, a salient feature of the present construction being the reversibility of the upper one of two rack sections by pivotal movement through 180° on a horizontal axis from a raised rack position to a lowered carrier position, so that the three balls previously resting on the upper rack section are securely and neatly caged with the three balls resting on the lower rack, the pivoted section, on which a carrying handle is provided, being detachably secured in either of its two positions, and casters being preferably provided on the lower fixed section for rolling support of the device during either of its two uses.

Figure 7:
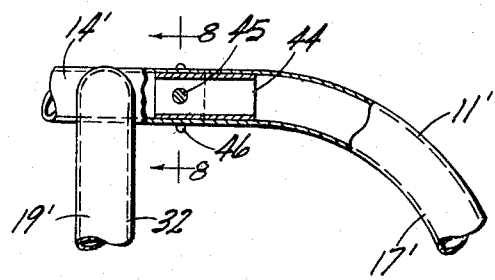
Figure 8:
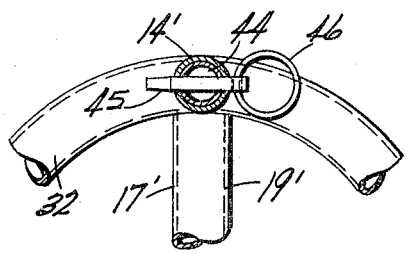
Figure 4:
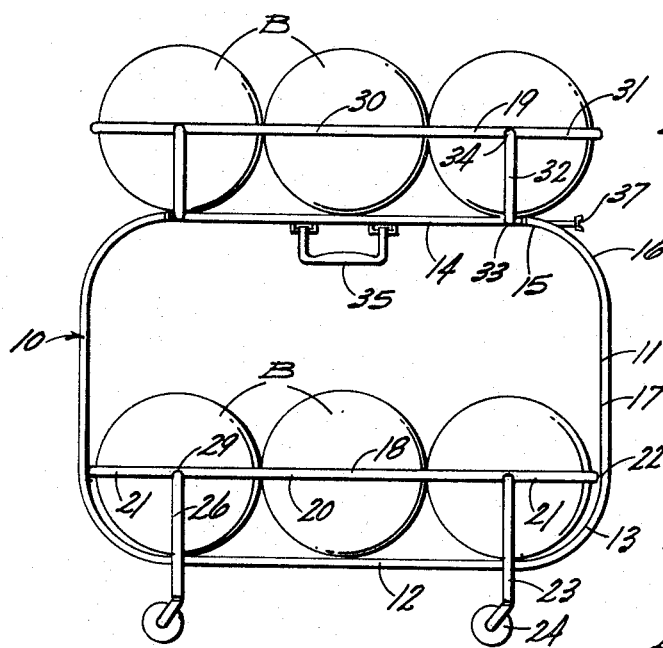
Figure 5:
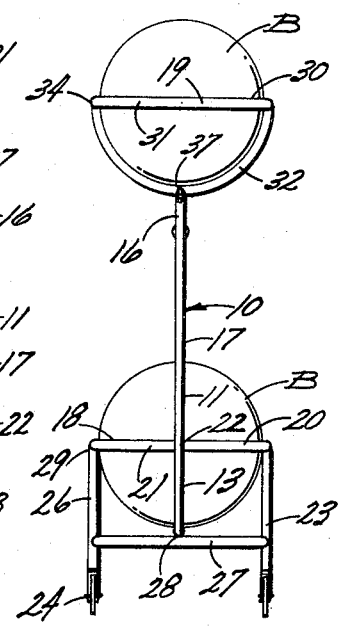

The invention is illustrated in the accompanying drawings, in which:

FIGS. 1, 2, and 3 are a side view, end view and top view, respectively, of a portable combination carrier and rack for basketballs and the like made in accordance with my invention and shown with the upper rack or trough section in its down or closed position for the carrying of the six basketballs shown;

FIGS. 4 and 5 are a side view and end view, respectively, of the same device with the upper rack or trough section reversed to its up or open position for use of the device as a portable rack on which the six balls are all stored for convenient removal and replacement;

FIG. 6 is an enlarged fragmentary view of the upper portion of FIG. 1 partly in side elevation and partly in longitudinal section on the line 6—6 of FIG. 3 showing the pivotal bearing for the upper rack section and the means for detachably securing said rack section in either of its two operative positions, an intermediate portion of the bearing tube and through bolt being broken away to permit showing the construction better on a larger scale than space would otherwise permit, and FIGS. 7 and 8 are two similar fragmentary views showing a modified or alternative construction for that of FIG. 6, FIG. 8 being taken on line 8—8 of FIG. 7.

Similar reference numerals are applied to corresponding parts throughout these views.

Referring to the drawings and first to FIGS. 1–6, the reference numeral 10 designates generally a portable combination carrier and rack for basketballs B and the like made in accordance with my invention, the same comprising a rectangular tubular frame 11, the lower longitudinal portion 12 of which is a fixed and integral part of the generally U-shaped main part of the frame while the upper longitudinal portion 14 is pivotally mounted at its opposite ends in parallel relation to the lower portion 12 in the coaxial inner ends 15 of the inwardly curved end portions 16 of the two vertical arms 17 of the U-shaped main part of the frame, a fixed lower rack or trough section 18 for three balls being provided in the lower half of the frame, and a pivoted reversible upper rack 19 for another three balls being carried on the aforesaid pivoted portion 14, whereby to enable converting from a portable carrier condition, as shown in FIGS. 1–3 to a portable rack condition, as shown in FIGS. 4 and 5. The fixed lower rack 13 comprises a tubular generally rectangular horizontal frame 20 disposed in the diametrical plane of the three balls B resting on the bottom portion 12 of the main frame 11, frame 18 having semi-circular end portions 21 conforming to the end balls and suitably secured, as by welding, at 22 to the arms 17 of the frame 11. The lower rack 18 forms a part of a dolly 23 on which the device 10 is readily rolled from place to place on casters 24, these being shown in FIGS. 1 and 2 as resting and running on a floor 25. Dolly 23 consists of two upright generally H-shaped tubular frames 26 suitably secured, as by weldings, of the cross-portions 27 to the bottom of the main frame 11 at 28 and by welding of the upper ends of the legs of these frames to the frame 18 at 29. The casters 24 are carried on the lower ends of the legs of the frames 26. The upper rack 19 comprises a generally rectangular horizontal frame 30, similar to frame 20, disposed in the diametrical plane of the three upper balls B, which, in the rack use shown in FIGS. 4 and 5, rest on the pivotal part 14 of the upper rack, the frame 30 having semi-circular end portions 31, like portions 21 on frame 20, and being made rigid with the pivotal part 14 by 90° arcuate arms 32 welded or otherwise suitably secured to the part 14 at one end, as at 33, and to the frame 30 at the other end, as at 34.

A carrying handle 35 is provided on the middle portion of frame part 14 and projects upwardly therefrom when the upper rack 19 is in its down or closed position for carrier use of the device, as in FIGS. 1–3, and it hangs harmlessly downwardly from part 14 when rack 19 is reversed to its up or open position, as in FIGS. 4 and 5.

Any suitable or preferred means may, of course, be provided for detachably securing the upper rack in either of its two operative positions. I have shown in FIGS. 1–6 a through bolt 36 having a wing-nut like knob 37 fixed on its one end where the bolt extends freely through a bearing 38 fixed on the adjacent curved end portion 16 of the one arm 17 of the main frame 11, the bolt extending freely through two ratchet bushings 39 and 40 fixed in opposite ends of part 14 and freely through a mating ratchet bushing 41 fixed in the end 15 of one of the two arms 17 but threaded, as indicated at 42 in another mating bushing 43 fixed in the end 15 of the other of said arms 17, whereby, when the bolt 36 is loose, there is freedom for pivotal movement of the upper rack 19, because the ratchet teeth on the cooperating ratchet bushings 39–41 and 40–43 are held apart under the inherent spring action of the arms 17, but, when the bolt 36 is tightened, the arms 17 are drawn toward each other as bushing 43 on one arm 17 is tightened as a nut on bolt 36 and drawn toward the bushing 41 on the other arm 17, thereby detachably securing the upper rack 19 in either of its two operative positions.

The modified or alternative construction shown in FIGS. 7 and 8 is much simpler and also easier to operate. It requires only two bearing bushings 44, one fixed in each of the arms 17' and having a working fit in the ends of the pivotal bearing part 14' of the upper rack 19', and a latch pin 45 inserted in registering holes in one end of the pivotal bearing part 14' and one of the bushings 44, these holes being diametrical of the two telescoping parts so as to enable locking the upper rack 19' in either of two positions 180° apart, namely, with the rack in the up or open position or in the down or closed position. The ring 46 in one end of the pin may have a chain or cord attached to it connecting the pin 45 to a part of the rack 19' so as to preclude the possibility of its being mislaid and lost.

The operation of this invention should be clear from the above description. When the rack 19 or 19' is in the down or closed position, the six balls B are caged securely against accidental displacement no matter which locking means is employed on the upper rack or how roughly the device may be handled. The light tubing employed in this device makes it quite easy to lift it, and the casters 24 on the dolly 23 enables rolling the device around easily when used as a carrier or as a rack. With rack 19 or 19' in the up or open position, the balls in both racks are easily accessible and readily removable and replaceable. The device is closed in carrying the balls to and from the game and is opened up for use on the floor on arrival at the game site.

It is believed the foregoing description conveys a good understanding of the objects and advantages of my invention. The appended claims have been drawn to cover all legitimate modifications and adaptations.

I claim:

1. A ball carrier comprising a frame, a pair of parallel elongated ball receiving troughs, each adapted to hold a row of balls, one of said troughs being fixed and the other pivoted to turn from a closed position facing the fixed trough, whereby to cage two rows of balls in the carrier for transportation, to an open position allowing egress of the balls, and means for releasably securing the pivoted trough in the closed position.

2. A ball carrier as set forth in claim 1 wherein the two troughs are substantially horizontally disposed with the fixed one on the bottom and open side up, the other one being rotatable through substantially 180° from an open side down position to an open side up position to hold a row of balls, the means for releasably securing the pivoted trough being adapted to secure it in either extreme position.

3. A carrier as set forth in claim 2 including a carrying handle on the pivoted trough at the middle of its closed side.

4. A carrier as set forth in claim 2 including roller means on the bottom of said frame for rolling support of the carrier independently of the position of the pivoted trough.

5. A carrier as set forth in claim 2 including a carrying handle on the pivoted trough at the middle of its closed side, and roller means on the bottom of said frame for rolling support of the carrier independently of the position of the pivoted trough.

6. A ball carrier comprising a substantially vertical generally U-shaped frame, the arms of the U carrying coaxially arranged bearings defining a substantially horizontal pivotal axis, a lower elongated ball carrying rack in said frame, an upper elongated ball carrying rack pivoted on said bearings to swing through substantially 180° from a down or closed position in a predetermined spaced parallel relation to said lower rack to cage two rows of balls between the two racks, to an up or open position wherein both racks function separately to hold balls, and means for releasably securing said upper rack in either of its two operative positions.

7. A ball carrier as set forth in claim 6 wherein one of the coaxially arranged bearings comprises a bushing fixed in one of the relatively rotatable parts and disposed in telescoping relation to the other of said parts, the bushing and rotatable part having diametrically extending holes which register in two operative positions of the upper rack 180° apart, and the means for releasably securing said upper rack in either of its two operative positions comprising a latch pin entered removably in said registering holes.

8. A ball carrier comprising a substantially vertical generally U-shaped frame, the arms of the U being springable outwardly away from each other and carrying coaxially arranged bearings defining a substantially horizontal pivotal axis, a lower elongated ball carrying rack in said frame, an upper elongated ball carrying rack pivoted on said bearings to swing through substantially 180° from a down or closed position in a predetermined spaced parallel relation to said lower rack to cage two rows of balls between the two racks, to an up or open position wherein both racks function separately to hold balls, and means for releasably securing said upper rack in either of its two operative positions, comprising means for forcing said springable arms inwardly toward each other to grip the upper rack therebetween.

9. A ball carrier as set forth in claim 8 wherein said last mentioned means includes a fixed ratchet element on said frame and a rotatable ratchet element on the upper rack, said ratchet elements being rotatable relative to one another only when the arms are spread apart.

10. A ball carrier as set forth in claim 8 wherein said last mentioned means includes a pair of fixed ratchet elements on said frame on opposite ends of said upper rack, a pair of rotatable ratchet elements on opposite ends of said upper rack, and a through bolt extending from one fixed ratchet element through the rotatable ratchet elements and threaded in the other fixed ratchet element and arranged when tightened to force the arms of said frame toward each other and also to cause locking engagement of the ratchet elements at both ends of the upper rack.

References Cited

UNITED STATES PATENTS

| D. 161,477 | 1/1951 | Lieber et al. | |
| 322,602 | 7/1885 | Henkel | 211—15 |
| 1,951,894 | 3/1934 | Ziebarth. | |
| 3,319,797 | 5/1967 | Felstehausen | 211—15 |

ROY D. FRAZIER, *Primary Examiner.*

A. FRANKEL, *Assistant Examiner.*